United States Patent
Launiainen

(10) Patent No.: US 8,998,097 B2
(45) Date of Patent: Apr. 7, 2015

(54) RFID TAG, A METHOD FOR MANUFACTURING AN RFID TAG, AND A PACKAGE

(75) Inventor: Anu Launiainen, Pirkkala (FI)

(73) Assignee: Smartrac IP B.V., Amsterdam (NL)

( * ) Notice: Subject to any disclaimer, the term of this patent is extended or adjusted under 35 U.S.C. 154(b) by 189 days.

(21) Appl. No.: 13/575,163

(22) PCT Filed: Jan. 25, 2011

(86) PCT No.: PCT/FI2011/050055
§ 371 (c)(1),
(2), (4) Date: Jul. 25, 2012

(87) PCT Pub. No.: WO2011/089321
PCT Pub. Date: Jul. 28, 2011

(65) Prior Publication Data
US 2012/0292399 A1  Nov. 22, 2012

(30) Foreign Application Priority Data
Jan. 25, 2010  (FI) ...................................... 20105063

(51) Int. Cl.
*G06K 19/06* (2006.01)
*G06K 19/04* (2006.01)
(Continued)

(52) U.S. Cl.
CPC .......... *G06K 19/047* (2013.01); *Y10T 29/49002* (2013.01); *G06K 19/07783* (2013.01); *G09F 23/00* (2013.01); *G09F 23/06* (2013.01); *G09F 3/0341* (2013.01); *G09F 3/14* (2013.01)

(58) Field of Classification Search
CPC ............ G06K 19/07749; G06K 19/04; G06K 19/041; G06K 19/07758; G06K 19/07762; G06K 19/07724; G09F 3/005; G09F 3/0288; G09F 3/0297; G09F 3/10; A01K 11/006; A01K 27/009; B29C 2045/14852; B29C 45/14639; B29C 45/14647; B29C 45/14836
USPC ......... 235/492, 375, 379, 382, 383, 493, 486, 235/487
See application file for complete search history.

(56) References Cited

U.S. PATENT DOCUMENTS 6,836,215 B1 *  12/2004  Laurash et al. ............ 340/572.1
6,991,175 B1 *  1/2006  Huang ........................... 235/492
(Continued)

FOREIGN PATENT DOCUMENTS

CN  2465264 Y  12/2001
CN  1584952 A  2/2005
(Continued)

OTHER PUBLICATIONS

PCT/ISA/210—International Search Report—May 6, 2011.
(Continued)

*Primary Examiner* — Thien M Le
(74) *Attorney, Agent, or Firm* — Venable LLP; Eric J. Franklin

(57) ABSTRACT

An RFID tag including a body part and a fixing part for attaching the body part to an object to be identified. The RFID tag includes at least one transponder. The body part and the fixing part include a single integrated piece. The fixing part is formed of a part with a ring-like or loop-like shape that can be fitted around at least a part of the object to be identified. A method for manufacturing an RFID tag and a package including several products separate from each other, including RFID tags for identifying the products separately from each other.

15 Claims, 3 Drawing Sheets

(51) Int. Cl.
*G06K 19/077* (2006.01)
*G09F 23/00* (2006.01)
*G09F 23/06* (2006.01)
*G09F 3/03* (2006.01)
*G09F 3/14* (2006.01)

(56) References Cited

U.S. PATENT DOCUMENTS

| | | | |
|---|---|---|---|
| 7,425,898 B2 * | 9/2008 | Ryckman | 340/572.1 |
| 7,961,108 B2 * | 6/2011 | Klein | 340/572.8 |
| 8,636,220 B2 * | 1/2014 | Warther | 235/492 |
| 8,654,018 B2 * | 2/2014 | Warther | 343/718 |
| 8,674,835 B2 * | 3/2014 | Klein | 340/572.8 |
| 2006/0109130 A1 | 5/2006 | Hattick et al. | |
| 2006/0236578 A1 | 10/2006 | Saint et al. | |
| 2008/0147211 A1 | 6/2008 | Teller | |
| 2009/0021377 A1 | 1/2009 | Launiainen | |

FOREIGN PATENT DOCUMENTS

| | | |
|---|---|---|
| CN | 101184437 A | 5/2008 |
| DE | 102006036484 A1 | 2/2008 |
| WO | WO-01/43096 A2 | 6/2001 |
| WO | WO-2005/091236 A1 | 9/2005 |
| WO | WO-2007/042879 A2 | 4/2007 |

OTHER PUBLICATIONS

PCT/ISA/237—Written Opinion of the International Searching Authority—May 6, 2011.

Finnish Office Action (With Translation)—Apr. 8, 2010.

European Search Report—Sep. 5, 2013 (Issued in Counterpart Application No. 11734414.3).

Chinese First Office Action (With Translation) December 2, 2014 (Issued in Counterpart Chinese Application No. 201180007030.X).

* cited by examiner

RFID TAG, A METHOD FOR MANUFACTURING AN RFID TAG, AND A PACKAGE

CROSS-REFERENCE TO RELATED APPLICATIONS

This application claims priority under 35 U.S.C. §119 to Finnish patent application 20105063 filed 25 Jan. 2010 and is the national phase under 35 U.S.C. §371 of PCT/FI2011/050055 filed 25, Jan. 2011.

FIELD OF THE INVENTION

The invention relates to an RFID tag. The invention also relates to a method and a package.

BACKGROUND OF THE INVENTION

Solutions for identification on the basis of RFID technology are applied in increasing lines of business. This may require the development of entirely novel types of RFID tags or the improvement of tag types already known, to find solutions which are as functional and inexpensive as possible but also affect the conventional use of the object as little as possible. In some applications, it may be difficult to read RFID tags attached in conventional ways, for example in the form of labels, to the object to be identified, because the tag cannot be easily attached to a place where it can be read electronically without obstacles. For example, in case of several products which should be identified separately from each other and which are stacked next to and/or on top of each other, the RFID tags of the sticker or label type require that these products are unpacked from their packaging so that the tags can be fixed to a place that is technically suitable for reading. Such products include, among other things, bottles or cans which are packed in the same packaging and whose use or consumption is to be controlled by identification based on RFID technology. Particularly in liquid packaging, the functionality of the RFID tag is significantly influenced by the location where the tag is fixed in the package, because the vicinity of liquids as well as metals will have a degrading effect on the readability of the RDIF tag.

Document WO 2007/042879 discloses a solution for a situation of the above-described kind, in which gas bottles are identified by using an RFID tag to be mounted onto the neck of the gas bottle. In this solution, the body of the RFID tag is provided with a receptacle in which the part that comprises the transponder (that is, the RFID chip and antenna) of the RFID tag is fixed by means of a relatively tight fit and a form joint between this part and the edges of the receptacle. For attaching the RFID tag onto the neck of the gas bottle, the edge of the body is provided with a collar that can be closed and opened, which is closed and locked around the neck of the gas bottle when the RFID tag is attached to the bottle. The sealability is implemented by making the collar of two parts, of which the first one is integrated in the body and the second one is a separate collar part which is connected to this by hinges and which can be switched open and closed and locked to the first part in such a way that these parts make up a closed annular loop connected to the body of the RFID tag. The aim of such a body structure and the attachment provided by it has been, among other things, to improve and to facilitate the usability of the RFID tag as well as to reduce interference on the RF signal possibly caused by the gas bottle made of metal, in comparison with a tag of the label type. However, the RFID tag implemented in this way has the disadvantage of a relatively complex structure, which makes it a relatively expensive solution with respect to, for example, RFID tags of the label type. In particular, if the products to be provided with such an RFID tag are products having a clearly lower price value than gas bottles, such an RFID tag body composed of several different parts is too expensive a solution for attaching the RFID tag. In many applications, the lock-up attachment of the RFID tag to the object does not have a significant value as such. Particularly in the marking of products with a low price, the utility value of the RFID tag is not diminished even if the tag could be detached from the object relatively easily.

Document WO 01/43096 discloses a system, a method, and an apparatus for controlling the consumption and sales of soft drinks in restaurants and bars. Here, sensors are provided on bottles used for storing beverages, on taps for beverages to be dispensed from a container, at doors of refrigerating rooms used for storing beverages, etc. to identify the object of use and to determine/evaluate the consumption of the beverage in question and to send this information to a computer controlling the system. In this case, a sensor attached to a single bottle may be attached, for example, to the bottom or the neck of the bottle. The sensor to be attached to the neck of the bottle is made annular so that it can be fitted around the neck of the bottle. The sensor always comprises a housing composed of separate parts, as well as, among other things, a separate power source and a radio transmitter which takes care of the data transmission between the sensor and the computer that controls the system; in other words, the sensors are so-called semi-active identifiers in the sense of identification. Because of their functions and structure, the sensors to be attached to a bottle, as presented in this document, are clearly too complex and expensive in their structure for mere identification, and there are not at all suitable for the identification of products sold at a low price in, for example, wholesale or retail trade.

SUMMARY OF THE INVENTION

It is an aim of the present invention to provide a novel kind of an RFID tag which is more suitable than previous RFID tags for the identification of, for example, such single products which are normally packed together with other corresponding products in the same multi package as deviating from individual packaging, but which, however, have to be identified separately from the other single products in the same multi package, for example for controlling their sale or consumption.

It is also an aim of the invention to provide, for example, bottles, cans, bars, tubes, plant seedlings or other objects or products to be handled and packed in a corresponding way, with a tag-type RFID identifier which is easy to attach and which is simpler in structure and easier to use than RFID tags of prior art to be typically attached to an object by means of a label, and whose manufacture and costs of use are lower than those of tags attached to their object in a similar way and/or used for a similar purpose. Yet another aim of the invention is to present a method for manufacturing an RFID tag according to the invention.

The new and inventive idea of the invention relates to the way in which a transponder, that is, a unit formed by an RFID chip and an antenna, included in a tag to be attached to a product is provided with fixing means needed for fixing it in a quite novel way. According to the basic principle of the invention, said fixing means, which normally comprise a body part and a fixing part connected to it without a separate joint, are formed of a single piece of a sheet-like or film-like material. They can thus be manufactured in a very inexpensive way by, for example, punching them out of larger pieces of sheet-like or film-like material comprising a material quantity sufficient for the manufacture of several fixing means. The fixing means for RFID tags intended for multi packaging may also comprise several body parts and fixing parts connected to each other by a suitable joining neck, all thus punched out of the same piece of sheet or film like material, that is, formed without joints to be provided separately between the different parts. Further, it should be noted that in this context, "punching" refers to punching out, cutting out, or any corresponding technique of machining which is obvious for a person skilled in the art on the basis of applying a mechanical tool as well as, for example, a laser beam, a fluid jet, ultrasound, or a chemical reaction, whereby the sheet-like material used as the raw material can be provided with cuts/punches penetrating through the material.

According to the invention, the transponder, i.e. an RFID chip and an antenna, may have been added to this sheet or film like material in connection with its manufacture or after the manufacture, before or first after the formation of the fixing means. If the transponder formed by the RFID chip and the antenna is ready in the material, the fixing part is normally formed (e.g. by punching) in such an area of the material which does not include the RFID chip and the antenna. Normally, the function of the fixing part is to constitute that part of the RFID tag, by means of which the RFID tag is attached to the object to be identified, and the function of the body part is to form the part where normally e.g. part of the transponder is placed. In many embodiments of the invention, the body part and the fixing part are punched/cut out of the sheet-like or film-like material in such a way that a neck connecting the body part and the fixing part is left between these parts. In some embodiments, however, the body part and the fixing part may also be such that the body part and the fixing part are connected to each other over their whole width or length, wherein there is no actual visible neck between the parts.

In the RFID tag according to the invention, the transponder may be entirely either in said body part or in the fixing part, or the transponder may be placed partly in both of said parts.

According to an advantageous embodiment of the invention, the transponder is placed entirely in the body part of the tag, wherein a difference in the position between the body part and the fixing part does not affect the electronic function of the tag, as in a situation in which for example part of the antenna is placed in the fixing part. This embodiment also has the advantage that the entire RFID transponder remains slightly off the object to which the tag is attached. Particularly in the case of fluid packages or metal objects, this improves the electronic function of the tag.

To put it more precisely, the RFID tag, the method, and the package according to the invention are characterized in what will be presented in the claims.

The RFID tag and the method according to the invention have the advantage that the fixing means needed for fixing the transponder according to them, formed by the RFID chip and the antenna, is very simple to manufacture and inexpensive in cost. Another advantage is the fact that such an RFID tag can be used in any uses in which the RFID tags are attached to their object by merely mechanical fixing based on hanging, in other words, without gluing. Yet another advantage is the fact that the installation of such an RFID tag in its suitable use is simple and can be easily automated, because it does not require the joining and/or assembling of separate parts. As a result, the RFID tag according to the invention, and the method for manufacturing the same, enable the application of RFID technology at competitive costs and in a profitable way even for the identification of separate products having a relatively low price value, such as various bottles, cans, bars, tubes, or the like, and being packed in the same multi packaging.

BRIEF DESCRIPTION OF THE DRAWINGS

Yet another advantage of the package according to the invention is the fact that the RFID tag according to the invention, used in the package and intended for multi packaging, is very low-cost in terms of its manufacture and installation in the product. Thus, the application of RFID tags for the identification of single products in multi packaging can be made more competitive in costs, when compared with, for example, bar code identification which is conventionally considered less expensive than RFID technology but has a significantly lower security level.

In the following, the invention will be described in more detail with reference to the appended drawings, in which.

DETAILED DESCRIPTION OF EMBODIMENTS OF THE INVENTION

Figure 1:
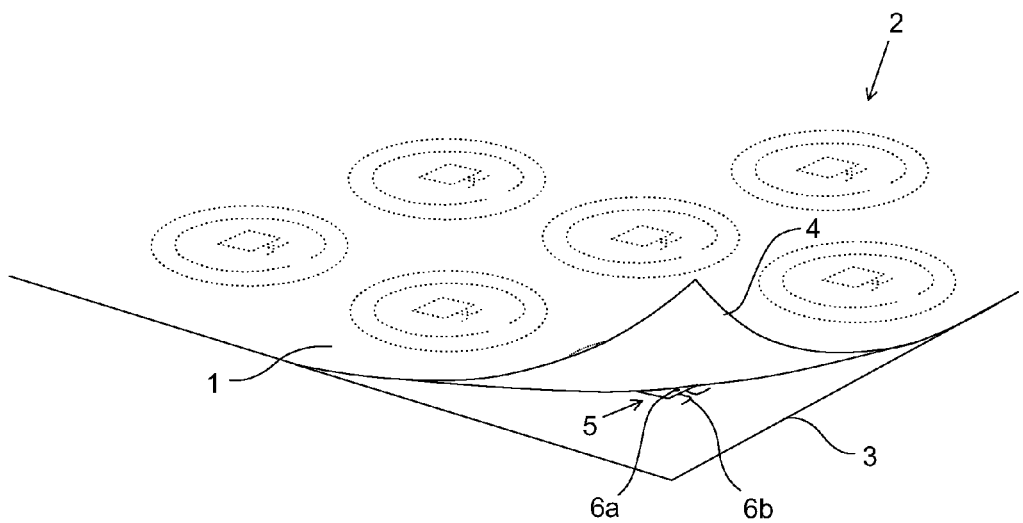
FIG. 1 shows a principle view of a sheet-like material used in the manufacture of some RFID tags according to the invention.

FIG. 1 shows a principle view of such a sheet-like material 1, of which some RFID tags 2 according to the invention are made by punching out. In this case, the RFID tag 2 is, for example, a so-called passive RFID tag which functions e.g. at a high or ultra-high frequency. The sheet-like material 1 shown in FIG. 1 is made of, for example, two cardboard layers or one cardboard layer and one paper layer, 3 and 4, between which transponders 5 are attached, that is, RFID chips 6a and antennas 6b connected to them, at regular intervals. In this case, the transponders 5 are attached by gluing to the lower material layer 3 of the sheet-like material 1 before the upper material layer 4 is attached to the lower material layer 3. The upper material layer 4 is glued onto the lower layer 3 immediately after the gluing of the transponders 5. It should be noted that the transponders 5 formed of RFID chips 6a and antennas 6b may also be transponders in a so-called inlay form, that is, transponders formed onto a film-like material (a thin plastic layer or paper), or between two such film-like materials. In some inlays, additional films may also be laminated onto the first film-like materials, on one or both sides of the inlay. In this case, the transponder mounted on the inlay or inside the inlay (between 2 to 4 films) can be placed between the material layers 3 and 4, or if there is no inlay or the inlay only comprises one film-like material layer in which the transponder is provided, the material layers 3 and 4 may, as such, form one or both of the film-like or sheet-like material layers of the inlay, between which layers the transponders 5 are placed. If the transponders 5 are not be provided between protective films of the inlay type when they are installed, the material layers 3 and 4 should be such that they give the transponder 5 the necessary mechanical protection, taking into account the requirements set by the use of the RFID tag 2.

The gluing of the transponders 5 onto the surface of either of the material layers, 3 or 4, can be performed manually or for example with a specific gluing device with a numerically controlled gluing head, by which the transponders 5 can be placed onto the sheet-like material 1 in such a way that their precise position in relation to each other and to the sheet-like material 1 can be determined by programming. Naturally, this programming data can be easily transferred forward, wherein in the next step, the detachment of the RFID tags 2 from the sheet-like material 1 can be easily implemented, for example, with a numerically controlled punching device, whose control system measures or detects the position of the sheet-like material 1 and selects the punching points on the basis of positioning data obtained from the gluing device.

The sheet-like material 1 may be provided in the form of sheets or a band. The attachment of the material layers 3 and 4 of the sheet-like material 1 in the form of a band can be easily automated, for example in such a way that the manufacture is arranged to take place in a production line, in which both material layers 3 and 4 of the sheet-like material are unwound from coils or reels and are guided on top of each other and pressed against each other by rolls. Thus, the attachment of the transponders 5 to the lower material layer 3 is naturally performed before the pressing of the material layers 3 and 4 against each other. The glue attaching the material layers 3 and 4 to each other can be applied onto either one or both of the material layers. For attaching the transponders 5, the same glue can be applied as for attaching the material layers 3 and 4 to each other. Thus, the transponders 5 can be laid out onto the lower material layer 3 at the stage when a suitable layer of glue has been applied onto it. The inlays that contain transponders 5 are normally supplied in reels with one or more transponders next to each other, but they may also be in the form of sheets. If the transponders are laid out from an inlay in the form of a reel, the transponders to be placed between the material layers 3 and 4 can be mounted by feeding a film-like material, unwound from a reel that contains transponders, between the material layers 3 and 4. Transponders provided in inlays in sheet form are best suitable for situations in which the material layers 3 and 4 are in sheet form as well. Thus, the inlay sheets can be placed between the sheets for the material layers 3 and 4 simultaneously when gluing them together, or, for example, by gluing the inlay sheet/s first onto e.g. the material layer 3 and then gluing the material layer 4 onto the inlay sheet/s, wherein the inlay sheet with the transponders 5 will remain between the material layers 3 and 4 as desired. The use of inlays has, among other things, the advantage of facilitating the layout of the transponders so that they are placed between the material layers at intervals which are as even as possible. When the quantity of material needed by the fixing means around the transponders is taken into account already in the step of manufacturing the inlays, the transponders can also be placed between the material layers in an advantageous way in view of wear-out of the material.

Figure 2:
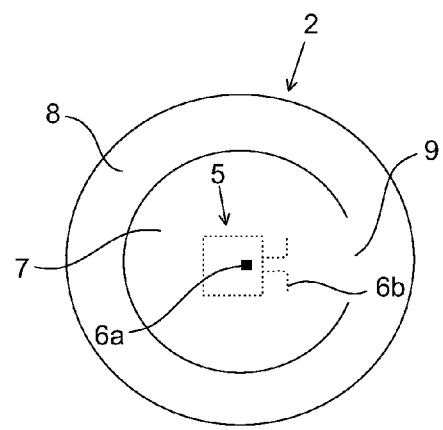
FIG. 2 shows a principle view of an RFID tag made of the sheet-like material shown in FIG. 1, detached from the sheet-like material.

After the assembly of the sheet-like material 1, finished RFID tags 2 have been cut out by punching at the transponders 5, as shown in FIG. 2, the tags having an inner circular body part 7 with a solid centre, and an annular fixing part 8 around it. In this case, the body part 7 is placed in such a way that the RFID chip 6a of the transponder 5 and the antenna 6b connected to it remain entirely inside it. The fixing part 8 has not been cut entirely off the body part 7 in the centre. In this case, the length of the uncut curve has been selected so that a neck 9 whose length is approximately 1 to 1.5 times the radius of the fixing part is left between the body part 7 and the fixing part 8. On the side of the outer edge of the fixing part 8, the punch extends entirely around the fixing part 8; in other words, this punch detaches the fixing part 8 and the central body part 7 from the sheet-like material 1. As a whole, the RFID tag 2 is thus punched out as a solid piece from a sheet-like material 1, wherein no separate joints are needed nor made between the body part 7 and the fixing part 8.

In the punching of the above-described RFID tags 2, it is possible to use such an automated punching device which performs several punches at a time (by a single punching stroke). For punching a sheet-like material 1 in the form of a band, the punching can be performed by means of a suitable punching roll or the like, in a continuous or intermittent manner, for example so that after each punching step, the sheet-like material 1 moves forward by one punching batch before the next punching step. In the case of sheet-like material 1 in sheet form, for example, all the RFID tags 2 on a single sheet can be punched at a time, after which a new sheet is taken to be punched. As an alternative to this, the punching can be performed, for example, by punching each RFID tag 2 individually, or by punching the RFID tags 2 in groups of several RFID tags. Furthermore, it should be noted that when punching the sheets, the punching tool can be kept stationary in the plane of the sheet, and the sheet can be moved in the direction of two axes, or the punching tool can be moved in a first direction (for example, direction y), and the sheet can be moved in another direction (for example, direction x), which is perpendicular to the first direction but parallel to the same plane.

Figure 3:
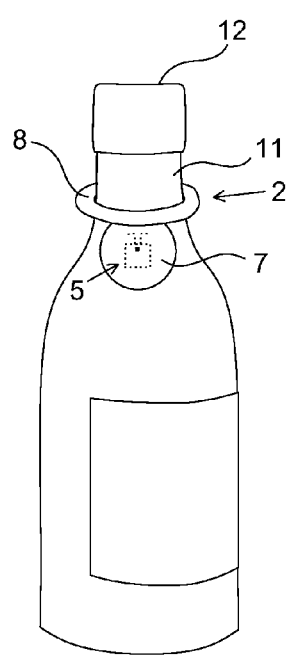
FIG. 3 shows a principle view of the RFID tag shown in FIG. 2, installed in the neck of a bottle.

FIG. 2 shows a single finished RFID tag 2 seen from above, after the punching step. FIG. 3, in turn, shows the finished RFID tag of FIG. 2 placed on the neck 11 of a bottle 10. Thus, the neck 11 of the bottle 10 has been fitted through the fixing part 8 so that the whole cap 12 of the bottle is above the fixing part 8. Thus, the fixing part 8 may have such an inner diameter that the mouth and the neck 11 of the bottle 10 can be fitted through the fixing part 8 in such a way that the fixing part 8 is fixed to the location between the neck 11 and the rest of the bottle 10, as shown in FIG. 3. However, if the cap 12 is fixed to the mouth of the bottle, it no longer fits through the fixing part 8. Thus, the RFID tag 2 can only be removed from the bottle 10 by removing its cap 12 first. As shown in FIG. 3, before the RFID tag 2 is installed on the neck 11 of the bottle 10, its body part 7 is bent downwards as shown in FIG. 3. The body part 7 can also be bent in such a way that it points upwards in the direction of the cap 11 of the bottle 10.

Figure 4:
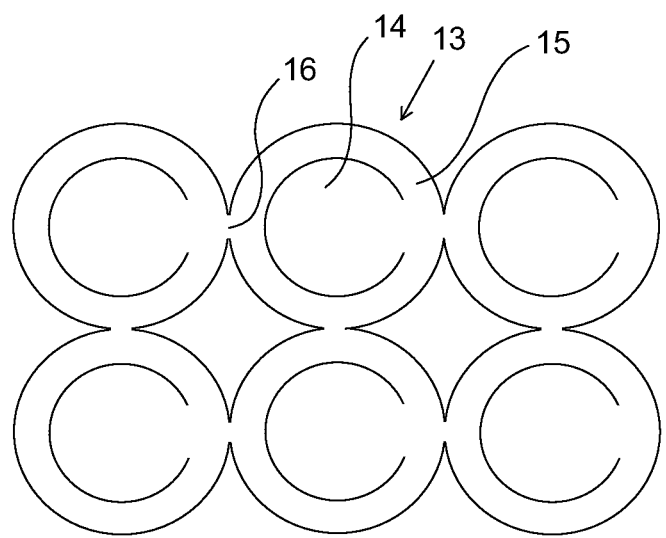
FIG. 4 shows a principle view of another RFID tag according to the invention, intended for identifying several can-like or jar-like pieces in the same package separately from each other.

FIG. 4 shows another RFID tag 13 according to the invention, also comprising a body part 14 and an annular fixing part 15 integrated in it. In this embodiment, the RFID tags 13 are punched off the sheet-like material in such a way that they are left attached to each other by small joining necks 16 between the outer peripheries of the fixing parts 15. Such an RFID tag 2 is intended for packages, in which the single products are next to each other, abutting each other according to a given orientation pattern, that is, for example packages of soft drink or beer cans. Furthermore, the joining necks 16 between these RFID tags 13 are made so weak that the removal of a single product from the package does not require the removal of all the RFID tags 13 but the RFID tag 13 around the product detaches from the other RFID tags 13 when said product is removed from the package. Thus, for example in the case of beverage cans, the tags can be used to identify which can has been removed from the package and which ones are still attached to the package.

Figure 5:
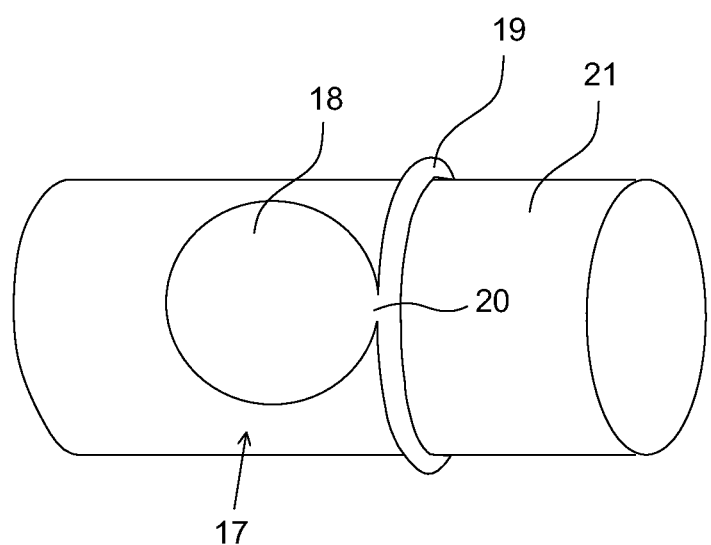
FIG. 5 shows an RFID tag intended for the identification of tubular or cylindrical pieces, installed on a tubular product.

FIG. 5 shows an RFID tag 17 according to the invention but slightly different from the embodiments shown in FIGS. 1 to 4, intended for the identification of various tubular products 21. In this case, the fixing part 19 of the RFID tag 17 is fitted around the tubular product 21. In this case, the body part 18 is placed outside the fixing part 19 in such a way that the neck 20 joining the body part 18 and the fixing part 19 to each other is at the outer edges of these.

The RFID tags 13 and 17 shown in both FIG. 4 and FIG. 5 can also be made, e.g. in the above-described way, of a sheet-like material formed of two material layers and transponders attached between these material layers. The tags shown in these figures are also RFID tags which are passive in their principle of operation, functioning at a suitable radio frequency.

Alternatively, RFID tags according to the invention can be manufactured, for example, in such a way that the transponder is attached to the body and fixing part punched out of a sheet-like material, after which another material layer is glued onto the body part, which has the same shape and may also consist of the same sheet-like material or another sheet-like or film-like material. In some cases, the transponder may be ready in the film-like material to be glued or laminated onto the body part and the fixing part, thinner than the body part and the fixing part. Naturally, the body part and the fixing part can also be made of a single material layer, the transponder being installed inside it or on its either surface. For example, when plastic is used, the body part and the fixing part can be die cast in a mould where the transponder is ready. In such an application, the neck between the body part and the fixing part can be provided, if necessary, with e.g. a fibre reinforcement to secure the strength of the neck.

Figure 6:
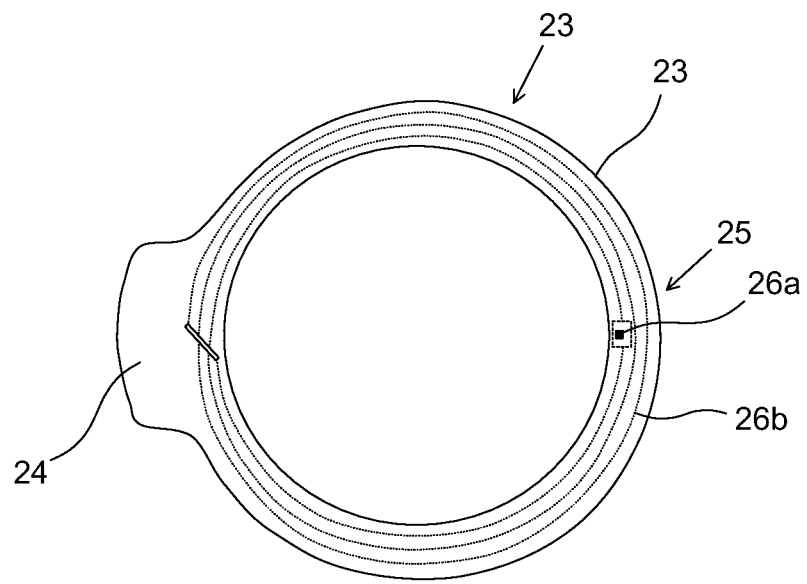
FIG. 6 shows an RFID tag according to the invention, in which the entire transponder is included in the fixing part.

It is not necessary in all cases that the transponder is attached to the body part. In some cases, at least the antenna can be placed entirely or partly inside the fixing part. FIG. 6 shows such an RFID tag 22, where the whole transponder 25 formed of a chip 26a and an antenna 26b is placed in the fixing part 23. In this embodiment, the body part 24 forms a lip and/or a surface for markings to be made in the tag. Another difference in the embodiment of FIG. 6 is that the antenna used is a coil-type antenna instead of a dipole antenna. In an embodiment such as in FIG. 6, the body part may also be formed, for example, of two or more elements placed on opposite sides of the fixing part and wider than the other sections of the fixing part, or in such a way that the body part is not actually distinguished from the fixing part but it has an even width on the whole length of the circumference of the fixing part.

Figure 7:
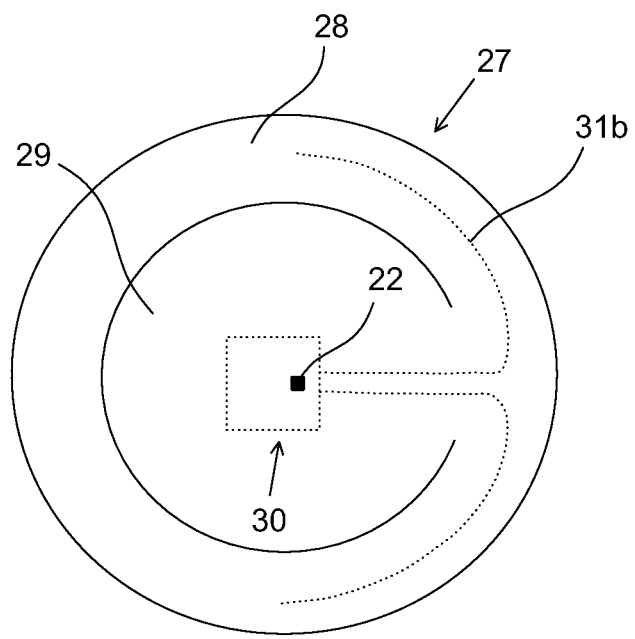
FIG. 7 shows an RFID tag according to the invention, in which the RFID chip of the transponder is in the body part and the antenna is in the fixing part.

FIG. 7 shows such an RFID tag 27, similar to those of FIGS. 1 to 3, in which the RFID chip 31a of the transponder 30 is in the body part 29 and the antenna 31b is in the fixing part 28. In this case, the antenna 31b is arranged to extend by an arc of about ±90° from the joining neck within the fixing part 28. Also in such embodiments, it would be possible to use, as the antenna, alternatively e.g. a coil antenna similar to the antenna of the embodiment of FIG. 6.

In some embodiments of the RFID tag, the body part and the fixing part may have an angular shape, that is, for example a triangular, quadrangular or polygonal shape. However, the body part and the fixing part do not need to be similar in shape. For example, a circular fixing part can be used with a quadrangular body part. To minimize the material consumption, if desired, the body part and the fixing part can also be shaped in such a way that as little remainder material as possible is left around the body and fixing parts to be cut out of the material.

The invention is not limited to the above-presented example embodiments, but it may vary within the scope of the inventive idea presented in the claims.

The invention claimed is:

1. An RFID tag, comprising:
   a body part;
   a fixing part configured to attach the body part to an object to be identified; and
   at least one transponder,
   wherein the body part and the fixing part comprise a single integrated piece of a sheet-like or film-like material, wherein the fixing part comprises a jointless annular or loop-like body to be fitted around at least a part of the object to be identified, and wherein the body part and the fixing part are formed such that the body part is surrounded by the fixing part.

2. The RFID tag according to claim 1, wherein the body part and the fixing part comprise a sheet-like or film-like material formed of material layers attached on top of each other.

3. The RFID tag according to claim 1, further comprising:
   a neck connecting the body part and the fixing part, the neck comprising a same material as the body part and the fixing part.

4. The RFID tag according to claim 1, wherein the body part extends in a lateral direction from an edge of the fixing part.

5. The RFID tag according to claim 1, wherein at least two RFID tags are connected to each other by a joining neck, next to each other.

6. The RFID tag according to claim 1, wherein an RFID chip is in the body part.

7. The RFID tag according to claim 6, wherein an antenna is in the body part.

8. The RFID tag according to claim 7, wherein at least part of the antenna is in the fixing part.

9. A method for manufacturing an RFID tag comprising a body part, a fixing part and a transponder, the method comprising:
   simultaneously making a body part and a fixing part from a single integrated piece of a sheet-like or film-like material such that the body part is surrounded by the fixing part and such that the fixing part is formed of a part with a jointless annular or loop-like body that can be fitted around at least a part of the object to be identified.

10. The method according to claim 9, wherein the body part and the fixing part are made by punching or cutting out.

11. The method according to claim 9, wherein the transponder is included in the sheet-like or film-like material of the body part and the fixing part during manufacture of the sheet-like or film-like material.

12. The method according to claim 9, wherein the transponder is included in the sheet-like material after the manufacture of the sheet-like material, before the cutting or punching of the body part and the fixing part out of the sheet-like material.

13. The method according to claim 9, wherein the transponder is included in the sheet-like material after the cutting or punching of the body part and the fixing part.

14. A package, comprising:
   a plurality of products separate from each other;
   RFID tags included with the products for identifying the products separately from each other, the RFID tags each comprising a body part, a fixing part configured to attach the body part to the products, and at least one transponder, wherein the body part and the fixing part comprise a single integrated piece of a sheet-like or film-like material, wherein the fixing part comprises a joinless annular or loop-like body to be fitted around at least a part of the products, and wherein the body part and the fixing part are formed such that the body part is surrounded by the fixing part, and wherein the body part extends in a lateral direction from an edge of the fixing part, wherein the RFID tags are attached to the packages such that at least two products in the package include RFID tags connected to each other by a joining neck.

15. The package according to claim 14, wherein the fixing part of the RFID tags are fitted around each product or its part in the package.

* * * * *